United States Patent
Lee

(10) Patent No.: US 6,917,489 B2
(45) Date of Patent: Jul. 12, 2005

(54) APPARATUS AND METHOD FOR PERFORMING SEEK-SERVO ROUTINE OF HARD DISK DRIVE

(75) Inventor: Ju-Il Lee, Gumi-si (KR)

(73) Assignee: Samsung Electronics Co., LTD, Suwon-si (KR)

( * ) Notice: Subject to any disclaimer, the term of this patent is extended or adjusted under 35 U.S.C. 154(b) by 419 days.

(21) Appl. No.: 10/073,898

(22) Filed: Feb. 14, 2002

(65) Prior Publication Data

US 2002/0196578 A1 Dec. 26, 2002

(30) Foreign Application Priority Data

Feb. 22, 2001 (KR) .......................................... 2001-8999

(51) Int. Cl.$^7$ .............................................. G11B 5/596
(52) U.S. Cl. ................................................. 360/78.06
(58) Field of Search .......................... 360/78.06, 78.05, 360/78.07; 318/560; 327/553

(56) References Cited

U.S. PATENT DOCUMENTS

| | | | | |
|---|---|---|---|---|
| 5,936,792 A | * | 8/1999 | Kobayashi et al. | 360/78.07 |
| 6,005,363 A | * | 12/1999 | Aralis et al. | 318/560 |
| 6,101,065 A | | 8/2000 | Alfred et al. | |
| 6,268,765 B1 | * | 7/2001 | Gopinathan et al. | 327/553 |
| 6,441,988 B2 | * | 8/2002 | Kang et al. | 360/78.06 |
| 6,563,665 B1 | * | 5/2003 | Ell | 360/78.05 |

FOREIGN PATENT DOCUMENTS

| | | |
|---|---|---|
| EP | 0 263 962 | 4/1988 |
| EP | 441 407 | 8/1991 |
| GB | 2 342 492 | 4/2000 |
| JP | 2304777 | 12/1990 |
| KR | 1999-15989 | 9/1991 |
| WO | WO 88/02913 | 4/1988 |

OTHER PUBLICATIONS

United Kingdom Patent Office Combined Search and Examination Report application No. GB 0125017.4 dated May 23, 2002.

* cited by examiner

*Primary Examiner*—Sinh Tran
*Assistant Examiner*—K. Wong
(74) *Attorney, Agent, or Firm*—Robert E. Bushnell, Esq.

(57) ABSTRACT

A seek-servo apparatus and method used by a hard disk drive is capable of making the actual position of a head correctly follow the target position of the head irrespective of time delay. The seek-servo apparatus of a hard disk drive is capable of moving a head to a desired track location, and includes an actuator which moves the head to the desired track location in response to an acceleration command having a target acceleration, which leads a target velocity and a target position by a predetermined time. Therefore, the head can be correctly positioned at a desired location on a desired track in real time, and the time for the head to read/write information can be significantly shortened.

22 Claims, 2 Drawing Sheets

APPARATUS AND METHOD FOR PERFORMING SEEK-SERVO ROUTINE OF HARD DISK DRIVE

CLAIM OF PRIORITY

This application makes reference to, incorporates the same herein, and claims all benefits accruing under 35 U.S.C. §119 from my application APPARATUS AND METHOD FOR PERFORMING SEEK-SERVO ROUTINE OF HAD DISK DRIVE filed with the Korean Industrial Property Office on 22 Feb. 2001 and there duly assigned Serial No. 8999/2001.

BACKGROUND OF THE INVENTION

1. Technical Field

The present invention relates to a hard disk drive (HDD) and, more particularly, to a seek-servo apparatus and method of a hard disk drive capable of moving a head to the correct location of a desired track.

2. Related Art

A hard disk drive includes a magnetic disc, a spindle motor, a transducer, a slider, a head gimbal assembly (HGA), an actuator arm, a voice coil, a magnetic assembly, a voice coil motor, and a bearing assembly. The transducer is positioned adjacent to the surface of the magnetic disc which is rotatably driven by the spindle motor so that the transducer can write or read information on the magnetic disc by magnetizing or sensing a magnetic field of the magnetic disc. The transducer may be realized as one transducer or as two transducers, including one for writing information and one for reading information. The slider, which can be integrated with the transducer, can be manufactured and employed to create an air bearing between the transducer and the surface of the magnetic disc. In addition, the slider can be integrated with the head gimbal assembly. The head gimbal assembly may be mounted on the actuator arm including the voice coil, and the voice coil may be located adjacent to the magnetic assembly in order to define the voice coil motor (VCM). When current is applied to the voice coil, torque is generated, and that makes the actuator arm rotate about the bearing assembly. When the actuator arm rotates, the transducer moves across the surface of the magnetic disc.

In most cases, information is stored in annular tracks of the magnetic disc, and in general, each of the tracks includes a plurality of sectors. Each of the sectors has a data field and an identification field. The identification field contains grey code information identifying a particular sector and track. In order to write/read information on/from another track, the transducer moves along the surface of the magnetic disc. The act of moving the transducer to access another track is referred to as a seek routine. In other words, during a seek routine, the voice coil motor is excited with current, and thus the transducer can be moved from a current track on the surface of the magnetic disc to a new track. A controller (not shown) for controlling the movement of the transducer and the actuator arm moves the transducer from the current track to the new track in accordance with a seek routine and a servo control routine. The servo control routine ensures that the transducer moves to a correct track location.

If a conventional seek-servo apparatus for performing a seek-servo routine in a hard disk drive (which commonly designates both a seek routine and a servo control routine) is ideal, in other words, if the apparatus does not have any delay time, the acceleration command [u(t)] of the head can be expressed by the following equation:

$$u(t)=\ddot{y}_w(t)+K_v[\dot{y}_w(t)-\dot{y}(t)]+K_p[y_w(t)-y(t)] \quad (1)$$

where $\ddot{y}_w(t)$ represents a desired acceleration trajectory (hereinafter, referred to as "target acceleration") of the head to be accelerated, $\dot{y}_w(t)$ represents a velocity trajectory (hereinafter, referred to as "target velocity") of the head, $y_w(t)$ represents a desired position trajectory of the head to be moved (hereinafter, referred to as "target position"), y(t) represents an actual distance by which the head actually moves over the magnetic disc (i.e., the actual position of the head), $K_v$ and $K_p$ represent a velocity constant and a position constant, respectively, C represents differentiation, and CC represents double differentiation. If the target acceleration of the head is sin(t), the target velocity is 1−cos(t), and the target position is t−sin(t).

The acceleration command of the head defined by Equation (1) is Laplace-converted. Then, transient response characteristics represented by a ratio between a Laplace-converted target position $[Y_w(s)/L\{y_w(t)\}]$ and an actual position $[Y(s)/L\{y(t)\}]$ can be expressed by the following equation:

$$\frac{Y(s)}{Y_w(s)} = \frac{s^2 + K_v s + K_p}{s^2 + K_v s + K_p} = 1 \quad (2)$$

Equation (2) shows that, if a time delay $T_d$ is 0, the actual position y(t) of the head correctly follows the target position $y_w(t)$ of the head. However, in order to move the head to a desired track location on the magnetic disc, the conventional seek-servo apparatus spends a predetermined amount of time $T_d$ to compute an acceleration command defined by Equation (1), and to vary the torque of the head using an actuator (not shown) in accordance with the computed acceleration command. If a time delay occurs for the predetermined time $T_d$, an acceleration command u'(t) of the head can be expressed by the following equation:

$$u'(t)=\ddot{y}_w(t-T_d)+K_v[\dot{y}_w(t-T_d)-\dot{y}(t-T_d)]+K_p[y_w(t-T_d)-y(t-T_d)] \quad (3)$$

Here, after Laplace-converting Equation (3), transient response characteristics represented by a ratio between a Laplace-converted target position $[Y_w(s)/L\{y_w(t)\}]$ and a Laplace-converted actual position $[Y(s)/L\{y(t)\}]$ can be defined by the following equation:

$$\frac{Y(s)}{Y_w(s)} = \frac{(s^2 + K_v s + K_p)e^{-T_d s}}{s^2 + K_v s e^{-T_d s} + K_p e^{-T_d s}} \neq 1 \quad (4)$$

Equation (4) shows that, if a time delay is not 0, the conventional seek-servo apparatus cannot make the actual position of the head correctly follow the target position. Finally, the conventional seek-servo apparatus causes an overshoot, introduced by the time delay $T_d$, and thus cannot correctly move the head to a desired track location.

SUMMARY OF THE INVENTION

To solve the above-described problems, it is a first object of the present invention to provide a seek-servo apparatus of a hard disk drive capable of making the actual position of a head follow the target position of the head irrespective of time delay.

It is a second object of the present invention to provide a seek-servo method performed in the seek-servo apparatus of a hard disk drive.

Accordingly, to achieve the first object, there is provided a seek-servo apparatus of a hard disk drive capable of moving a head to a desired track location, wherein the apparatus includes an actuator which moves the head to the desired track location in response to an acceleration command having a target acceleration which leads a target velocity and a target position by a predetermined time.

To achieve the second object, there is provided a seek-servo method capable of moving a head to a desired track location in a hard disk drive, wherein the method includes a step of moving the head to the desired track location using an acceleration command having a target acceleration which leads a target velocity and a target position by a predetermined time.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF THE INVENTION

The present invention will now be described more fully with reference to the accompanying drawings.

Figure 1:
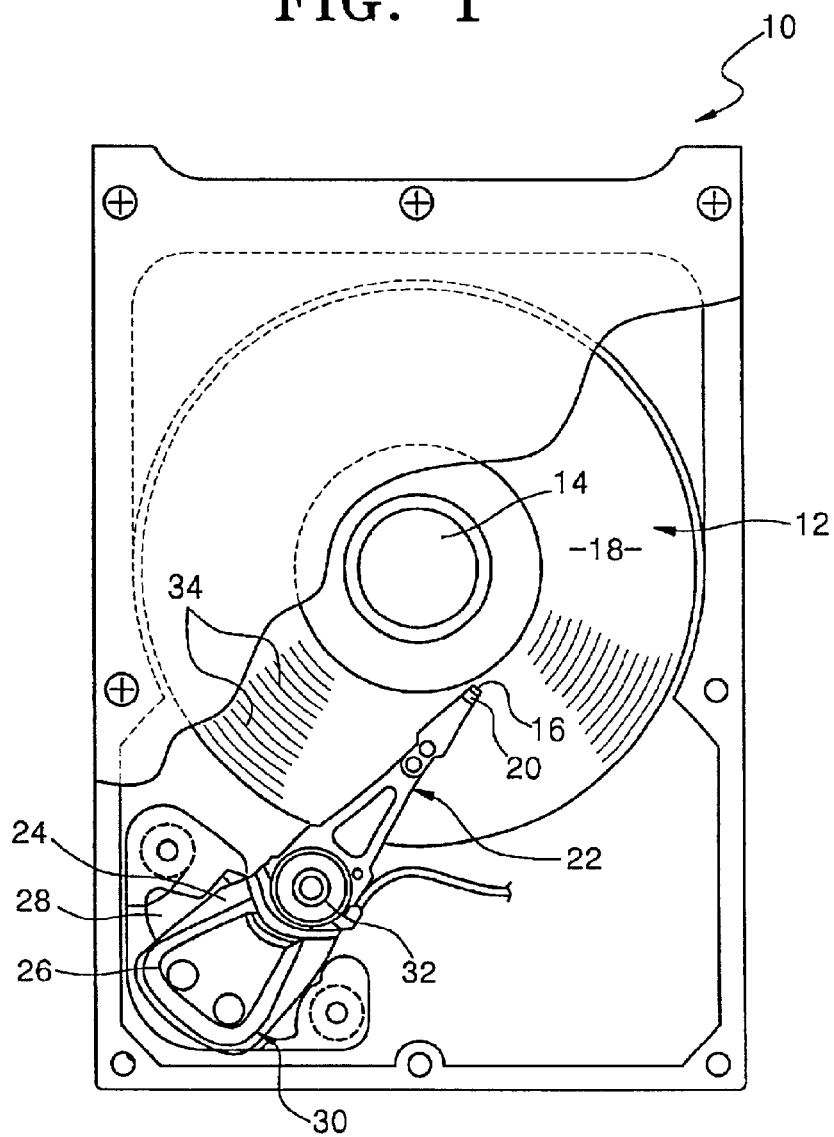
FIG. 1 is a plan view of a hard disk drive.

FIG. 1 is a plan view of a hard disk drive. The hard disk drive 10 includes a magnetic disc 12, a spindle motor 14, a transducer 16, a slider 20, a head gimbal assembly (HGA) 22, an actuator arm 24, a voice coil 26, a magnetic assembly 28, a voice coil motor 30, and a bearing assembly 32.

Referring to FIG. 1, the transducer 16 located adjacent to the surface 18 of the magnetic disc 12 is rotatably driven by the spindle motor 14 so that it can write or read information on the magnetic disc 12 by magnetizing or sensing a magnetic field of the magnetic disc 12. The transducer 16, as shown in FIG. 1, may be realized as one transducer, or it may be realized as two transducers, including one for writing information and one for reading information. The slider 20, which can be integrated with the transducer 16, is manufactured and employed to create an air bearing between the transducer 16 and the surface 18 of the magnetic disc 12. In addition, the slider 20 can be integrated with the head gimbal assembly 22. The head gimbal assembly 22 may be mounted on the actuator arm 24, including the voice coil 26, and the voice coil 26 may be positioned adjacent to the magnetic assembly 28 in order to define the voice coil motor (VCM) 30. When current is applied to the voice coil 26, torque is generated, and this makes the actuator arm 24 rotate about the bearing assembly 32. When the actuator arm 24 rotates, the transducer 16 moves across the surface 18 of the magnetic disc 12.

In most cases, information is stored in annular tracks 34 of the magnetic disc 12, and in general, each of the tracks 34 includes a plurality of sectors. Each of the sectors has a data field and an identification field. The identification field contains grey code information identifying a particular sector and track. In order to write/read information on/from another track, the transducer 16 moves along the surface 18 of the magnetic disc 12. The act of moving the transducer 16 to access another track is referred to as a "seek routine". In other words, during a seek routine, the voice coil motor 30 is excited with current, and thus the transducer 16 can be moved from the current track on the surface 18 of the magnetic disc 12 to a new track. A controller (not shown) for controlling the movement of transducer 16 and the actuator arm 24 moves the transducer 16 from the current track to the new track in accordance with a seek routine and a servo control routine. The servo control routine ensures that the transducer 16 moves to a correct track location.

If a seek-servo apparatus for performing a seek-servo routine in a hard disk drive 10 (which commonly designates both a seek routine and a servo control routine) is ideal, in other words, if the apparatus does not have any delay time, the acceleration command [u(t)] of the head (transducer 16 and slider 20) can be expressed by the following equation:

$$u(t) = \ddot{y}_w(t) + K_v[\dot{y}_w(t) - \dot{y}(t)] + K_p[y_w(t) - y(t)] \qquad (1)$$

where $\ddot{y}_w(t)$ represents a desired acceleration trajectory (hereinafter, referred to as "target acceleration") of the head 16 and 20 to be accelerated, $\dot{y}_w(t)$ represents a velocity trajectory (hereinafter, referred to as "target velocity") of the head 16 and 20, $y_w(t)$ represents a desired position trajectory of the head 16 and 20 to be moved (hereinafter, referred to as "target position"), y(t) represents an actual distance by which the head 16 and 20 actually moves over the magnetic disc 12 (i.e., the actual position of the head 16 and 20), $K_v$ and $K_p$ represent a velocity constant and a position constant, respectively, C represents differentiation, and CC represents double differentiation. If the target acceleration of the head 16 and 20 is sin(t), the target velocity is 1−cos(t), and the target position is t−sin(t).

The acceleration command of the head 16 and 20 defined by Equation (1) is Laplace-converted. Then, transient response characteristics represented by a ratio between a Laplace-converted target position $[Y_w(s)/L\{y_w(t)\}]$ and an actual position $[Y(s)/L\{y(t)\}]$ can be expressed by the following equation:

$$\frac{Y(s)}{Y_w(s)} = \frac{s^2 + K_v s + K_p}{s^2 + K_v s + K_p} = 1 \qquad (2)$$

Equation (2) shows that, if time delay $T_d$ is 0, the actual position y(t) of the head 16 and 20 correctly follows the target position $y_w(t)$ of the head 16 and 20. However, in order to move the head 16 and 20 to a desired track location on the magnetic disc 12, the seek-servo apparatus spends a predetermined amount of time $T_d$ to compute an acceleration command defined by Equation (1) and to vary the torque of the head 16 and 20 using an actuator (not shown) in accordance with the computed acceleration command. If a time delay occurs for the predetermined amount of time $T_d$, an acceleration command u'(t) of the head 16 and 20 can be expressed by the following equation:

$$u'(t) = \ddot{y}_w(t - T_d) + K_v[\dot{y}_w(t - T_d) - \dot{y}(t - T_d)] + K_p[y_w(t - T_d) - y(t - T_d)] \qquad (3)$$

After Laplace-converting Equation (3), transient response characteristics represented by a ratio between a Laplace-converted target position $[Y_w(s)/L\{y_w(t)\}]$ and a Laplace-converted actual position $[Y(s)/L\{y(t)\}]$ can be defined by the following equation:

$$\frac{Y(s)}{Y_w(s)} = \frac{(s^2 + K_v s + K_p)e^{-T_d s}}{s^2 + K_v se^{-T_d s} + K_p e^{-T_d s}} \neq 1 \quad (4)$$

Equation (4) shows that, if time delay is not 0, the seek-servo apparatus cannot make the actual position of the head 16 and 20 correctly follow the target position. Finally, the seek-servo apparatus causes an overshoot introduced by the time delay $T_d$ and thus cannot correctly move the head 16 and 20 to a desired track location.

Figure 2:
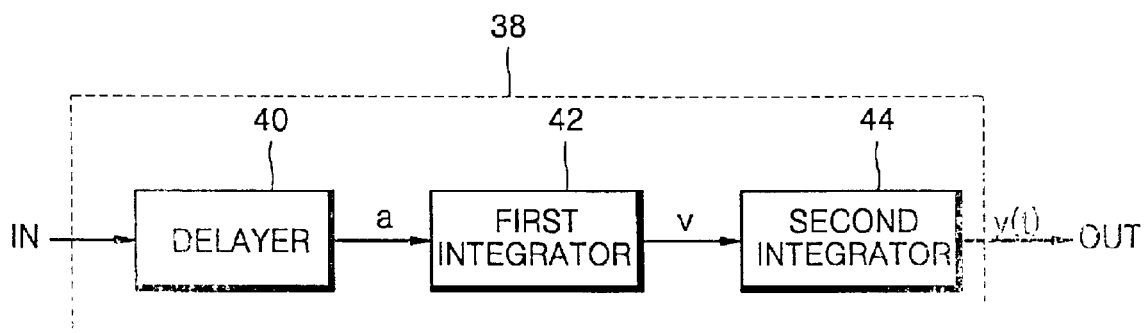
FIG. 2 is a block diagram of an embodiment of an actuator of a seek-servo apparatus according to the present invention.

FIG. 2 is a block diagram of an embodiment of an actuator 38 of a seek-servo apparatus according to the present invention. The actuator 38 includes a delayer 40, a first integrator 42, and a second integrator 44.

The actuator 38 of the seek-servo apparatus of the hard disk drive according to the present invention receives an acceleration command $u_E(t)$ having a target acceleration $a_w(t+T_d')$ component a predetermined time $T_d'$ ahead of a target position $y_w(t)$ and a target velocity $v_w(t)$ via an input terminal IN, moves head 16 and 20 to a desired location in response to the acceleration command received via the input terminal IN, and outputs position information y(t) concerning a position to which the head 16 and 20 is moved via an output terminal OUT. The predetermined time $T_d'$ indicates the time taken to move the head 16 and 20 to a desired location in the seek-servo apparatus according to the present invention. For example, the predetermined time $T_d'$ may be the time taken to compute the acceleration command $u_E(t)$ and the time taken for the actuator 38 to vary the torque of the head in response to the computed acceleration command $u_E(t)$.

Hereinafter, the structure and operation of the actuator 38 according to an embodiment of the present invention will be described in greater detail.

The delayer 40 of the actuator 38 shown in FIG. 2 receives an acceleration command $u_E(t)$ via the input terminal IN, delays the acceleration command $u_E(t)$ for the predetermined period of time $T_d'$, and outputs the results to the first integrator 42 as an acceleration $[a(t)=\ddot{y}_w(t)]$. In other words, the delayer 40 has a transfer function $e^{-T_d' s}$. The first integrator 42 integrates the acceleration a(t) output from the delayer 40, and outputs the results as a velocity [v(t)=ẏw(t)] to the second integrator 44. Next, the second integrator 44 integrates the velocity v(t) output from the first integrator 42 and outputs the results as position information y(t) via the output terminal OUT. Accordingly, the transfer function of each of the first and second integrators 42 and 44 is 1/s.

The target position $y_w(t)$, the target velocity $v_w(t)$, and the target acceleration $a_w(t+T_d')$ are externally computed whenever a grey code stored in a particular track to which the head is moved is read. In the present invention, the target acceleration $a_w(t+T_d')$ leads the target velocity $v_w(t)$ and the target position $y_w(t)$ by the predetermined time Td', and thus the acceleration command $u_E(t)$ can be expressed by the following equation:

$$u_E(t) = \ddot{y}_w(t+T_d') + K_v[\dot{y}_w(t) - \dot{y}(t)] + K_p[y_w(t) - y(t)] \quad (5)$$
$$= a_w(t+T_d') + K_v[v_w(t) - v(t)] + K_p[y_w(t) - y(t)]$$

where $\ddot{y}_w(t+T_d')$ represents the target acceleration $a_w(t+T_d')$ which leads the target velocity $v_w(t)$ and the target position $y_w(t)$ by the predetermined time Td', Kv and Kp represent a velocity constant and a position constant, respectively, and ẏw(t) represents the target velocity $v_w(t)$.

The acceleration command $u_E(t)$ input into the actuator 38 shown in FIG. 2 may be externally given thereto or may be generated in the seek-servo apparatus according to the present invention.

Figure 3:
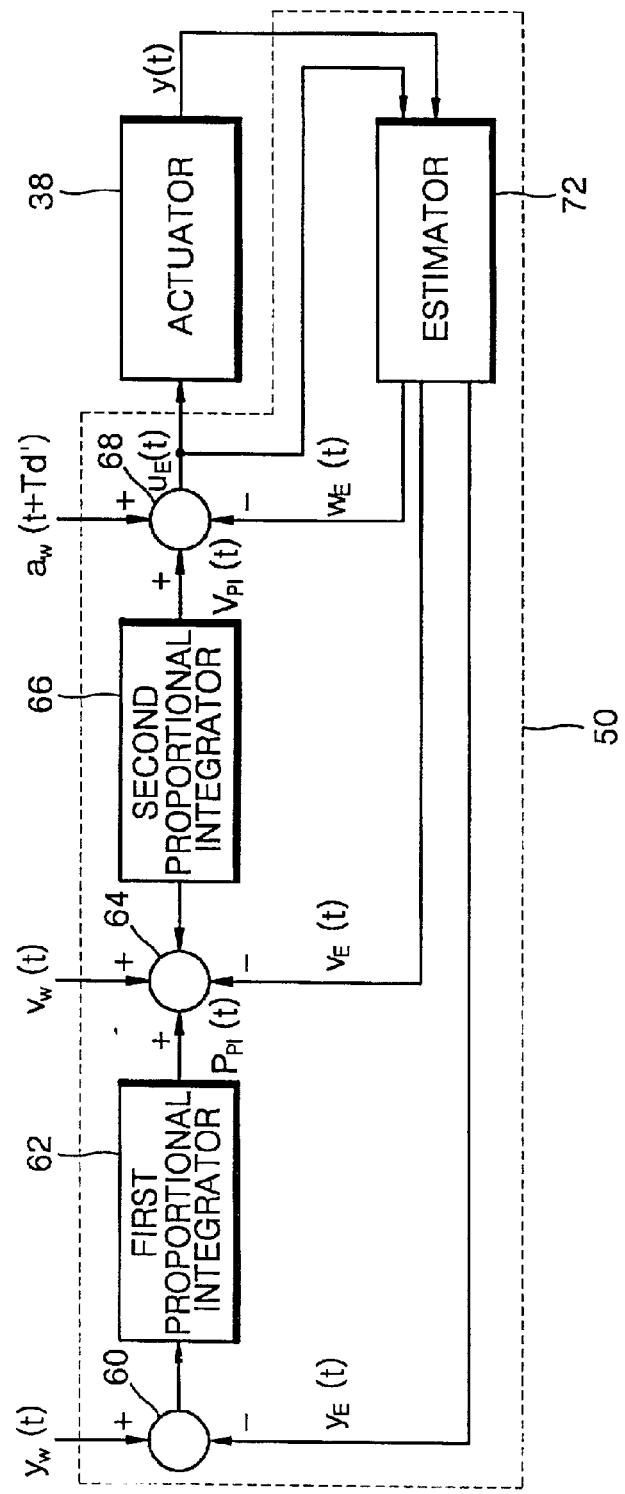
FIG. 3 is a block diagram of a seek-servo apparatus according to an embodiment of the present invention.
Figure 1:
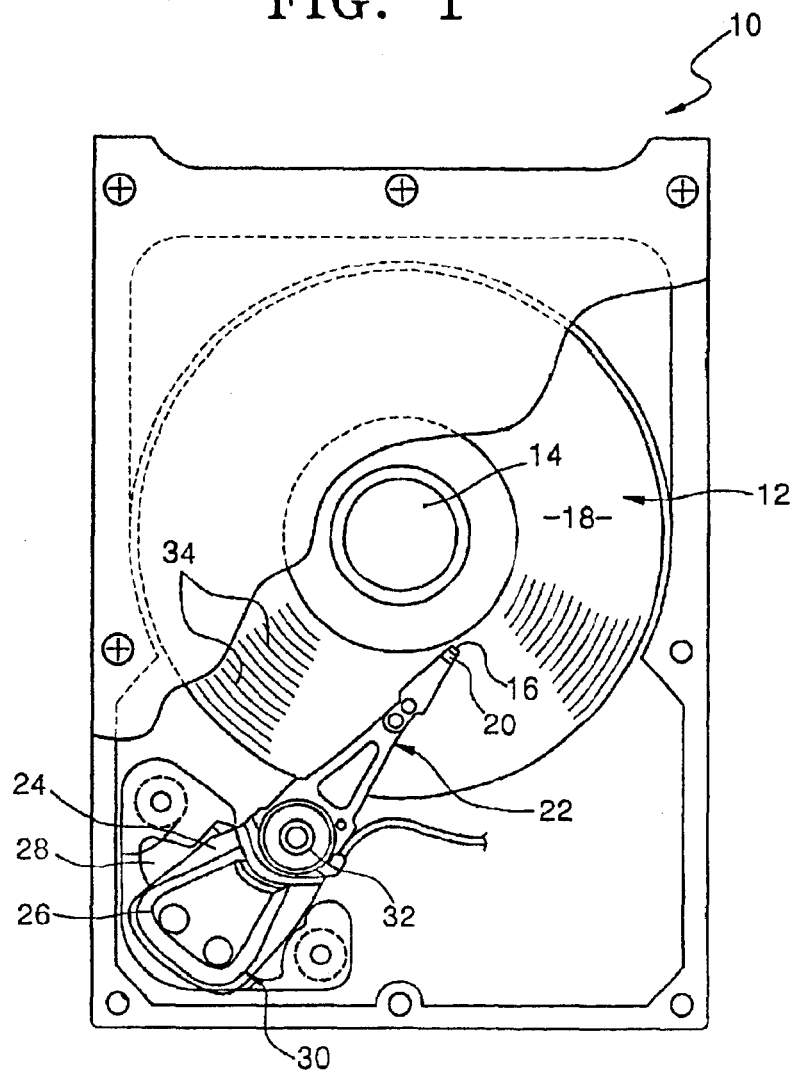
Figure 2:
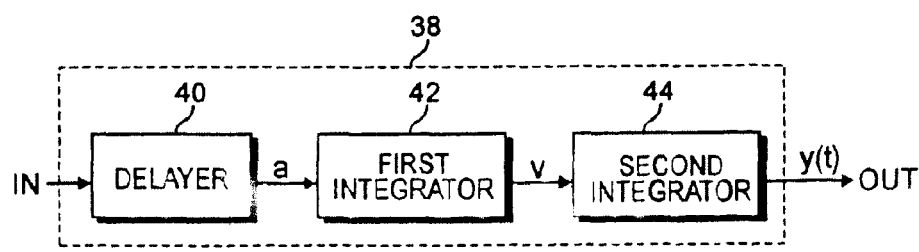

FIG. 3 is a block diagram of a seek-servo apparatus according to an embodiment of the present invention. The seek-servo apparatus includes a controller 50 and an actuator 38.

The controller 50 shown in FIG. 3 generates the acceleration command $u_E(t)$ using the air target position $y_w(t)$, the target velocity $v_w(t)$, and the target acceleration $a_w(t+T_d')$, which are externally input. The controller 50 includes a subtracting unit 60, a first proportional integrator 62, a second proportional integrator 66, a first adding/subtracting unit 64, a second adding/subtracting unit 68, and an estimator 72.

The subtracting unit 60 included in the controller 50 of the seek-servo apparatus shown in FIG. 3 subtracts an estimated actual position $y_E(t)$ of the head output from the estimator 72 from the target position $y_w(t)$, and outputs the result of the subtraction $y_w(t) - y_E(t)$ to the first proportional integrator 62. The first proportional integrator 62 receives the result of the subtraction output from the subtracting unit 60, proportionally integrates the results of the subtraction as shown in Equation (6), and outputs the results of the proportional integration, i.e., a position correction value $p_{PI}(t)$, to the first adding/subtracting unit 64 in accordance with the following:

$$p_{PI}(t) = K_1 \times [y_w(t) - y_E(t)] + K_2 \times \int [y_w(t) - y_E(t)] dt \quad (6)$$

where $K_1$ and $K_2$ represent a proportional constant and an integration constant, respectively, which are previously stored in the first proportional integrator 62 and used for the derivation of Equation (6).

The first adding/subtracting unit 64 adds the position correction value $p_{PI}(t)$ to the target velocity $v_w(t)$, subtracts an estimated actual velocity $v_E(t)$ of the head output from the estimator 72 from the result of the addition, and outputs the result of $v_w(t) + p_{PI}(t) - v_E(t)$ to the second proportional integrator 66.

The second proportional integrator 66 receives the output $v_w(t) + p_{PI}(t) - v_E(t)$ of the first adding/subtracting unit 64, proportionally integrates the output $v_w(t) + p_{PI}(t) - v_E(t)$ of the first adding/subtracting unit 64 as shown in Equation (7), and outputs the results of the proportional integration, i.e., a velocity correction value $v_{PI}(t)$, to the second adding/subtracting unit 68 in accordance with the following:

$$v_{PI}(t) = K_3 \times [v_w(t) + p_{PI}(t) - v_E(t)] + K_4 \times \int [v_w(t) + p_{PI}(t) - v_E(t)] dt \quad (7)$$

where $K_3$ and $K_4$ represent a proportional constant and an integration constant, respectively, which are previously stored in the second proportional integrator 66 and used for the derivation of Equation (7).

The second adding/subtracting unit 68 subtracts a feedforward acceleration $w_E(t)$ of the head from the results of adding the velocity correction value $v_{PI}(t)$ to the target acceleration $a_w(t+T_d')$ and outputs the result of $a_w(t+T_d') + v_{PI}(t) - w_E(t)$ to the actuator 38 and the estimator 72 as the acceleration command $u_E(t)$.

Here, when $w_E(t) = K_2 = K_4 = 0$, $K_1 K_3 = K_p$, and $K_3 = K_v$, the acceleration command $[u_E(t) = a_w(t+T_d') + v_{PI}(t) - w_E(t)]$ input from the second adding/subtracting unit 68 to the actuator 38 is equal to Equation (5).

The estimator 72 estimates the feedforward acceleration $w_E(t)$, actual velocity, and actual position of the head based on the acceleration command $u_E(t)$ and the position information y(t) of the head moved by the actuator 38 and outputs the estimated actual position $y_E(t)$, estimated actual velocity $v_E(t)$, and estimated feedforward acceleration $w_E(t)$ of the head 16 and 20 to the subtracting unit 60, and the first and second adding/subtracting units 64 and 68, respectively.

For example, suppose that the state equation of the actuator 38 shown in FIG. 2 can be expressed by the following equation:

$$\dot{y}(t) = v(t) \quad (8)$$
$$\dot{v}(t) = u_E(t - T_d) + d(t)$$
$$\dot{d}(t) = 0$$

where d(t) indicates disturbance and 'd(t)=0' indicates that d(t) is a constant. The estimator 72 can estimate the feed-forward acceleration $w_E(t)$, actual velocity $v_E(t)$, and actual position $y_E(t)$ of the head 16 and 20 derived by the following equation:

$$\dot{y}_E(t) = v_E(t) + l_1[y(t) - y_E(t)] \quad (9)$$
$$\dot{v}_E(t) = u_E(t - T_d) + w_E(t) + l_2[y(t) - y_E(t)]$$
$$\dot{w}_E(t) = l_3[y(t) - y_E(t)]$$

where $l_1$ is a constant having a unit of $s^{-1}$ (here, s represents second), $l_2$ is a constant having a unit of $s^{-2}$, and $l_3$ is a constant having a unit of $s^{-3}$.

The position response characteristics of the head 16 and 20 moved by the seek-servo apparatus and method according to the present invention can be expressed by the following equation:

$$\ddot{y}(t) = \ddot{y}_w(t) + K_v[\dot{y}_w(t-T_d) - \dot{y}(t-T_d)] + K_p[y_w(t-T_d) - y(t-T_d)] \quad (10)$$

At this point, after Laplace-converting Equation (10), the ratio between the Laplace-converted actual position Y(s) and target position $Y_w(s)$ of the head 16 and 20 can be expressed by the following equation:

$$\frac{Y(s)}{Y_w(s)} = \frac{s^2 + K_v s e^{-T_d s} + K_p e^{-T_d s}}{s^2 + K_v s e^{-T_d s} + K_p e^{-T_d s}} = 1 \quad (11)$$

When comparing Equation (4) with Equation (11), it is seen that the seek-servo apparatus and method according to the present invention can make the actual position of a head 16 and 20 correctly follow the target position of the head 16 and 20 even in a case where the time delay $T_d'$ is not 0.

The time taken for the controller 50 of the present invention shown in FIG. 3 to compute the acceleration command $u_E(t)$, for example, the time for the estimator 72 to estimate the corresponding value, the time taken for the first and second proportional integrators 62 and 66 to perform proportional integration on their inputs, the time taken for the subtracting unit 60 to perform subtraction, the time taken for the first and second adding/subtracting units 64 and 68 to perform adding/subtraction on their inputs, and the time taken to compute a target position $y_w(n)$, a target velocity $v_w(n)$, and a target acceleration $a_w(n+1)$, may be included the predetermined time $T_d'$.

In the meantime, the invention entitled "hard disk drive for reducing sound-noise and method thereof", disclosed in Korean Patent No. 1999-43313 (patented on Oct. 7, 1999), shows that, if a seek length $X_{SK}$ is given, the discrete time trajectories of the target acceleration $a_w(t+Td')$, the target velocity $v_w(t)$, and the target position $y_w(t)$ can be found. Accordingly, $\ddot{y}_w(t+T_d')$ shown in Equation (5) can be computed.

However, in the present invention, since the predetermined time $T_d'$ can be obtained so as to be nearly equal to a sampling period $T_s$, the target acceleration $a_w(n+1)$ (where n represents a discrete time, in particular, a servo sample count) can be realized so as to lead the target velocity $v_w(n)$ and the target position $y_w(n)$ by as much as one servo sample just by simply setting the predetermined time $T_d'$ to '1' without additional computation. Therefore, the target acceleration $a_w(n+1)$, the target velocity $v_w(n)$, and the target position $y_w(n)$ can be expressed by Equations (12), (13), and (14), respectively, based on the above, as follows:

$$a_w(n+1) = \frac{2\pi X_{SK}}{N_{SK}^2 T_{SM}^2} \sin 2\frac{\pi(n+1)}{N_{SK}} \quad (12)$$

where $X_{SK}$ indicates a seek length and $N_{SK}$ indicates a seek time per a sample;

$$v_w(n) = \frac{X_{SK}}{N_{SK} T_{SM}}\left[1 - \cos\left(\frac{2\pi n}{N_{SK}}\right)\right] \quad (13)$$

where $T_{SM}$ indicates a servo sampling time; and $$y_w(n) = \frac{X_{SK}}{N_{SK}}n - \frac{X_{SK}}{2\pi}\sin\frac{2\pi n}{N_{SK}}. \quad (14)$$

The controller 50 of the seek-servo apparatus according to the present invention generates an acceleration command $u_E(n)$ and may be realized, for example, by a microcontroller or a digital signal processing chip.

The seek time required for the seek-servo apparatus and method according to the present invention to move a head to a desired track location at room temperature (25 EC) was compared with the seek time required for a conventional seek-servo apparatus to move a head to a desired track location at room temperature (25 EC), and the comparison results are as follows:

TABLE 1

| | | $X_{SK} = 1$ | | | $X_{SK} = NT/3$ | | | | | |
|---|---|---|---|---|---|---|---|---|---|---|
| | Mode | Fwd | Rev | Avg | OD | MD | ID | Avg | $X_{SK}$ = NT | $X_{SK}$ = random |
| Read | Prior Art | 0.55 | 0.55 | 0.55 | 9.34 | 9.32 | 9.32 | 9.33 | 16.80 | 9.05 |
| | Present Invention | 0.47 | 0.48 | 0.47 | 9.28 | 9.20 | 9.29 | 9.26 | 16.73 | 8.89 |
| Write | Prior Art | 0.46 | 0.45 | 0.46 | 9.00 | 8.96 | 8.99 | 8.98 | 16.43 | 8.66 |
| | Present Invention | 0.40 | 0.41 | 0.40 | 8.95 | 8.87 | 8.98 | 8.93 | 16.39 | 8.64 |

In Table 1, '$X_{SK}=1$' indicates that a seek-servo apparatus moves a head by as much as a unit track; '$X_{SK}=NT/3$' (where NT represents the number of tracks prepared on the surface of a disc) indicates that the seek-servo apparatus moves a head as much as NT/3 tracks; '$X_{SK}=NT$' indicates that the seek-servo apparatus moves a head by as much as the total number of tracks; '$X_{SK}$=random' indicates that the seek-servo apparatus moves a head by as much as a random number of tracks; Fwd indicates the forward movement of a head; Rev indicates the reverse movement of a head; OD represents the outer diameter of a disk; MD represents the middle diameter of a disk; ID represents the inner diameter of a disk, and Avg represents the average of OD, MD, and ID.

Table 1 shows that the seek-servo apparatus and method according to the present invention, in general, show improved seek performance compared to the conventional seek-servo apparatus. Therefore, according to the present invention, the time that it takes to write/read information on/from a disc in a hard disk drive can be shortened.

As described above, the seek-servo apparatus and method used in a hard disk drive according to the present invention set a target acceleration in consideration of the time delay Td', and thus can remove overshoot and make the actual position of a head follow the target position of the head correctly and desirably. Therefore, it is possible to move the head to a desired track location in real time, and to significantly shorten the time that it takes for the head to write or read information.

Although the preferred embodiments of the present invention have been described, it will be understood by those skilled in the art that the present invention should not be limited to the described preferred embodiment. Rather, various changes and modifications can be made within the spirit and scope of the present invention, as defined by the following claims.

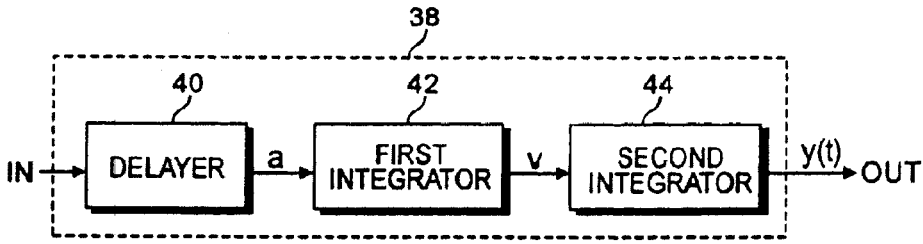

What is claimed is:

1. A seek-servo apparatus of a hard disk drive capable of moving a head to a desired track location, the seek-servo apparatus comprising:
    receiving means for receiving an acceleration command having a target acceleration which leads a target velocity and a target position by a predetermined time; and
    an actuator which moves the head to the desired track location in response to the acceleration command having the target acceleration which leads the target velocity and the target position by the predetermined time.

2. The seek-servo apparatus of claim 1, wherein the predetermined time includes the time that it takes to compute the acceleration command and the time that it takes for the actuator to vary a torque of the head in response to the computed acceleration command.

3. The seek-servo apparatus of claim 1, further comprising:
    an adding/subtracting unit which subtracts a feedforward acceleration of the head from a result of adding a velocity correction value to the target acceleration to obtain a result of subtraction, and which outputs the result of subtraction as the acceleration command to the receiving means; and
    an estimator which estimates the feedforward acceleration of the head based on the acceleration command and position information concerning a position of the head moved;
    wherein the actuator outputs the position information to the estimator.

4. The seek-servo apparatus of claim 3, wherein the velocity correction value is obtained by adding a position correction value to the target velocity, subtracting an estimated actual velocity of the head from a result of adding the position correction value to the target velocity, and proportionally integrating a result of subtracting the estimated actual velocity of the head from a result of adding the position correction value to the target velocity; and
    wherein a position correction value is obtained by subtracting an estimated actual position of the head from the target position and proportionally integrating a result of subtracting the estimated actual position of the head from the target position; and
    wherein the estimator estimates an actual velocity and an actual position based on an acceleration command output from the adding/subtracting unit and a position information output from the actuator.

5. The seek-servo apparatus of claim 4, wherein the actuator comprises:
    a delayer which delays an acceleration command output from the adding/subtracting unit for the predetermined time and outputs a result of delaying the acceleration command;
    a first integrator which integrates the result of delaying the acceleration command and outputs a result of integration; and
    a second integrator which integrates the result of integration and then outputs an integrator result as the position information to the estimator.

6. The seek-servo apparatus of claim 3, wherein the actuator comprises:
    a delayer which delays an acceleration command output from the adding/subtracting unit for the predetermined time and outputs a result of delaying the acceleration command;
    a first integrator which integrates the result of delaying the acceleration command and outputs a result of integration; and
    a second integrator which integrates the result of integration and outputs an integrator result as the position information to the estimator.

7. The seek-servo apparatus of claim 6, wherein the target acceleration is derived by the equation $$a_w(n+1) = \frac{2\pi X_{SK}}{N_{SK}^2 T_{SM}^2} \sin\frac{2\pi(n+1)}{N_{SK}}$$

where $a_w(n+1)$ represents the target acceleration, n represents a servo sample number, $X_{SK}$ represents a seek length, and $N_{SK}$ represents a seek time per a sample; and
    wherein the target velocity is derived by the equation $$v_w(n) = \frac{X_{SK}}{N_{SK} T_{SM}}\left[1 - \cos\left(\frac{2\pi n}{N_{SK}}\right)\right]$$

where $v_w(n)$ represents the target velocity and $T_{SM}$ represents a servo sampling time; and
    wherein the target position is derived by the equation $$y_w(n) = \frac{X_{SK}}{N_{SK}}n - \frac{X_{SK}}{2\pi}\sin\frac{2\pi n}{N_{SK}}$$

where $y_w(n)$ represents the target position.

8. The seek-servo apparatus of claim 5, wherein the target acceleration is derived by the equation $$a_w(n+1) = \frac{2\pi X_{SK}}{N_{SK}^2 T_{SM}^2} \sin\frac{2\pi(n+1)}{N_{SK}}$$

where $a_w(n+1)$ represents the target acceleration, n represents a servo sample number, $X_{SK}$ represents a seek length, and $N_{SK}$ represents a seek time per a sample; and wherein the target velocity is derived by the equation $$v_w(n) = \frac{X_{SK}}{N_{SK}T_{SM}}\left[1 - \cos\left(\frac{2\pi n}{N_{SK}}\right)\right]$$

where $v_w(n)$ represents the target velocity and $T_{SM}$ represents a servo sampling time; and wherein the target position is derived by the equation $$y_w(n) = \frac{X_{SK}}{N_{SK}}n - \frac{X_{SK}}{2\pi}\sin\frac{2\pi n}{N_{SK}}$$

where $y_w(n)$ represents the target position.

9. The seek-servo apparatus of claim 2, wherein the predetermined time is equivalent to a unit servo sample.

10. The seek-servo apparatus of claim 1, wherein the actuator comprises:
   a delayer which delays an acceleration command output from the adding/subtracting unit for the predetermined time and outputs a result of delaying the acceleration command;
   a first integrator which integrates the result of delaying the acceleration command and outputs a result of integration; and
   a second integrator which integrates the result of integration and then outputs an integrator result as the position information to the estimator.

11. The seek-servo apparatus of claim 1, wherein the target acceleration is derived by the equation $$a_w(n+1) = \frac{2\pi X_{SK}}{N_{SK}^2 T_{SM}^2} \sin\frac{2\pi(n+1)}{N_{SK}}$$

where $a_w(n+1)$ represents the target acceleration, n represents a servo sample number, $X_{SK}$ represents a seek length, and $N_{SK}$ represents a seek time per a sample.

12. The seek-servo apparatus of claim 1, wherein the target velocity is derived by the equation $$v_w(n) = \frac{X_{SK}}{N_{SK}T_{SM}}\left[1 - \cos\left(\frac{2\pi n}{N_{SK}}\right)\right]$$

where $v_w(n)$ represents the target velocity and $T_{SM}$ represents a servo sampling time.

13. The seek-servo apparatus of claim 1, wherein the target position is derived by the equation $$y_w(n) = \frac{X_{SK}}{N_{SK}}n - \frac{X_{SK}}{2\pi}\sin\frac{2\pi n}{N_{SK}}$$

where $y_w(n)$ represents the target position.

14. The seek-servo apparatus of claim 1, wherein the target acceleration is represented by the equation $$u_E(t) = \ddot{y}_w(t + T_d') + K_v[\dot{y}_w(t) - \dot{y}(t)] + K_p[y_w(t) - y(t)]$$
$$= a_w(t + T_d') + K_v[v_w(t) - v(t)] + K_p[y_w(t) - y(t)]$$

where $\ddot{y}_w(t+T_d')$ represents the target acceleration $a_w(t+T_d')$ which leads the target velocity $v_w(t)$ and the target position $y_w(t)$ by the predetermined time Td', Kv and Kp represent a velocity constant and a position constant, respectively, and $\dot{y}w(t)$ represents the target velocity $v_w(t)$.

15. A seek-servo method, comprising the steps of:
   providing a head in a hard disk drive;
   receiving an acceleration command having a target acceleration which leads a target velocity and a target position by a predetermined time; and
   moving the head to a desired track location using the acceleration command having the target acceleration which leads the target velocity and the target position by the predetermined time.

16. The method of claim 15, wherein the predetermined time includes the time that it takes to compute the acceleration command and the time that it takes to vary the torque of the head in response to the computed acceleration command.

17. The method of claim 15, wherein the acceleration command is obtained by subtracting a feedforward acceleration of the head from a result of adding a velocity correction value to the target acceleration, and wherein the feedforward acceleration of the head is estimated based on the acceleration command and position information concerning a position of the head moved.

18. The method of claim 17, wherein the velocity correction value is obtained by adding a position correction value to the target velocity, subtracting an estimated actual velocity of the head from a result of adding the position correction value to the target velocity, and proportionally integrating a result of subtracting the estimated actual velocity of the head from a result of adding the position correction value to the target velocity; and
   wherein a position correction value is obtained by subtracting an estimated actual position of the head from the target position and proportionally integrating a result of subtracting the estimated actual position of the head from the target position; and
   wherein an actual velocity and an actual position are estimated based on an acceleration command output and a position information output.

19. The method of claim 15, wherein the target acceleration is derived by the equation $$a_w(n+1) = \frac{2\pi X_{SK}}{N_{SK}^2 T_{SM}^2} \sin\frac{2\pi(n+1)}{N_{SK}}$$

where $a_w(n+1)$ represents the target acceleration, n represents a servo sample number, $X_{SK}$ represents a seek length, and $N_{SK}$ represents a seek time per a sample.

20. The method of claim 15, wherein the target velocity is derived by the equation $$v_w(n) = \frac{X_{SK}}{N_{SK}T_{SM}}\left[1 - \cos\left(\frac{2\pi n}{N_{SK}}\right)\right]$$

where $v_w(n)$ represents the target velocity and $T_{SM}$ represents a servo sampling time.

21. The method of claim 15, wherein the target position is derived by the equation $$y_w(n) = \frac{X_{SK}}{N_{SK}}n - \frac{X_{SK}}{2\pi}\sin\frac{2\pi n}{N_{SK}}$$

where $y_w(n)$ represents the target position.

22. The seek-servo apparatus of claim 15, wherein the target acceleration is represented by the equation $$u_E(t) = \ddot{y}_w(t + T'_d) + K_v[\dot{y}_w(t) - \dot{y}(t)] + K_p[y_w(t) - y(t)]$$
$$= a_w(t + T'_d) + K_v[v_w(t) - v(t)] + K_p[y_w(t) - y(t)]$$

where $\ddot{y}_w(t+T_d')$ represents the target acceleration $a_w(t+T_d')$ which leads the target velocity $v_w(t)$ and the target position $y_w(t)$ by the predetermined time Td', Kv and Kp represent a velocity constant and a position constant, respectively, and $\dot{y}w(t)$ represents the target velocity $v_w(t)$.

* * * * *

UNITED STATES PATENT AND TRADEMARK OFFICE
CERTIFICATE OF CORRECTION

PATENT NO. : 6,917,489 B2
DATED : July 12, 2005
INVENTOR(S) : Ju-Il Lee

It is certified that error appears in the above-identified patent and that said Letters Patent is hereby corrected as shown below:

Title page,
Delete the figure, and replace with the attached figure.

Drawings,
Sheet 1 of 2, delete the figure 2 in its entirety and replace with the attached figure.

Signed and Sealed this

Fourth Day of October, 2005

JON W. DUDAS
*Director of the United States Patent and Trademark Office*

(12) United States Patent
Lee

(10) Patent No.: US 6,917,489 B2
(45) Date of Patent: Jul. 12, 2005

(54) APPARATUS AND METHOD FOR PERFORMING SEEK-SERVO ROUTINE OF HARD DISK DRIVE

(75) Inventor: Ju-Il Lee, Gumi-si (KR)

(73) Assignee: Samsung Electronics Co., LTD, Suwon-si (KR)

( * ) Notice: Subject to any disclaimer, the term of this patent is extended or adjusted under 35 U.S.C. 154(b) by 419 days.

(21) Appl. No.: 10/073,898

(22) Filed: Feb. 14, 2002

(65) Prior Publication Data

US 2002/0196578 A1 Dec. 26, 2002

(30) Foreign Application Priority Data

Feb. 22, 2001 (KR) .......................... 2001-8999

(51) Int. Cl.$^7$ .............................. G11B 5/596
(52) U.S. Cl. .................................... 360/78.06
(58) Field of Search .................... 360/78.06, 78.05, 360/78.07; 318/560; 327/553

(56) References Cited

U.S. PATENT DOCUMENTS

| | | | |
|---|---|---|---|
| 5,936,792 A | * 8/1999 | Kobayashi et al. | 360/78.07 |
| 6,005,363 A | * 12/1999 | Aralis et al. | 318/560 |
| 6,101,065 A | 8/2000 | Alfred et al. | |
| 6,268,765 B1 | * 7/2001 | Gopinathan et al. | 327/553 |
| 6,441,988 B2 | * 8/2002 | Kang et al. | 360/78.06 |
| 6,563,665 B1 | * 5/2003 | Ell | 360/78.05 |

FOREIGN PATENT DOCUMENTS

| | | |
|---|---|---|
| EP | 0 263 962 | 4/1988 |
| EP | 441 407 | 8/1991 |
| GB | 2 342 492 | 4/2000 |
| JP | 2304777 | 12/1990 |
| KR | 1999-15989 | 9/1991 |
| WO | WO 88/02913 | 4/1988 |

OTHER PUBLICATIONS

United Kingdom Patent Office Combined Search and Examination Report application No. GB 0125017.4 dated May 23, 2002.

* cited by examiner

Primary Examiner—Sinh Tran
Assistant Examiner—K. Wong
(74) Attorney, Agent, or Firm—Robert E. Bushnell, Esq.

(57) ABSTRACT

A seek-servo apparatus and method used by a hard disk drive is capable of making the actual position of a head correctly follow the target position of the head irrespective of time delay. The seek-servo apparatus of a hard disk drive is capable of moving a head to a desired track location, and includes an actuator which moves the head to the desired track location in response to an acceleration command having a target acceleration, which leads a target velocity and a target position by a predetermined time. Therefore, the head can be correctly positioned at a desired location on a desired track in real time, and the time for the head to read/write information can be significantly shortened.

22 Claims, 2 Drawing Sheets